(12) United States Patent
Rauscher

(10) Patent No.: US 6,874,100 B2
(45) Date of Patent: Mar. 29, 2005

(54) RAID SYSTEM WITH MULTIPLE CONTROLLERS AND PROOF AGAINST ANY SINGLE POINT OF FAILURE

(75) Inventor: Tomlinson G Rauscher, Ellicott City, MD (US)

(73) Assignee: Digi-Data Corporation, Columbia, MD (US)

( * ) Notice: Subject to any disclaimer, the term of this patent is extended or adjusted under 35 U.S.C. 154(b) by 732 days.

(21) Appl. No.: 09/903,835

(22) Filed: Jul. 12, 2001

(65) Prior Publication Data

US 2003/0041201 A1 Feb. 27, 2003

(51) Int. Cl.[7] .................................................. G06F 11/00
(52) U.S. Cl. ............................................. 714/6; 714/7
(58) Field of Search ................................. 714/5, 6, 7

(56) References Cited

U.S. PATENT DOCUMENTS

| | | | | |
|---|---|---|---|---|
| 5,600,783 A | * | 2/1997 | Kakuta et al. ................. | 714/6 |
| 5,613,141 A | * | 3/1997 | Szatkowski et al. ........... | 710/2 |
| 5,761,032 A | | 6/1998 | Jones | |
| 5,848,230 A | * | 12/1998 | Walker .......................... | 714/7 |
| 5,871,264 A | | 2/1999 | Ohara | |
| 5,890,214 A | * | 3/1999 | Espy et al. ................. | 711/114 |
| 5,975,738 A | * | 11/1999 | DeKoning et al. ............ | 700/79 |
| 6,018,456 A | | 1/2000 | Young | |
| 6,025,989 A | | 2/2000 | Ayd | |
| 6,038,681 A | * | 3/2000 | Saegusa ......................... | 714/6 |
| 6,061,250 A | | 5/2000 | Lavan | |
| 6,097,604 A | | 8/2000 | Hunter | |
| 6,148,352 A | | 11/2000 | Coale | |
| 6,178,521 B1 | * | 1/2001 | Filgate .......................... | 714/6 |
| 6,182,198 B1 | * | 1/2001 | Hubis et al. ................ | 711/162 |
| 6,192,027 B1 | * | 2/2001 | El-Batal ..................... | 370/222 |
| 6,330,687 B1 | * | 12/2001 | Griffith ......................... | 714/6 |
| 6,401,170 B1 | * | 6/2002 | Griffith et al. ............. | 711/114 |
| 6,732,289 B1 | * | 5/2004 | Talagala et al. ............... | 714/6 |
| 2001/0008008 A1 | * | 7/2001 | Mori ......................... | 711/114 |

OTHER PUBLICATIONS

Ridge, P.M. The book of SCCSI: A guide for Adventurers. Daly City Cal., No Starch Press. 1995. P. 323–329.

* cited by examiner

*Primary Examiner*—Scott Baderman
*Assistant Examiner*—Joshua Lohn
(74) *Attorney, Agent, or Firm*—William S. Ramsey

(57) ABSTRACT

A RAID system which functions despite any single point of failure is disclosed. The system has two or more controllers, a multiplicity of direct access storage devices arranged in racks, redundant connectors throughout, and an independent backplane, cables, power supply, and cooling system for each controller and for each rack of direct access storage devices. In a second embodiment, no backplane or midplane is included in the RAID system; rather each controller is connected directly with the direct access storage devices.

27 Claims, 5 Drawing Sheets

RAID SYSTEM WITH MULTIPLE CONTROLLERS AND PROOF AGAINST ANY SINGLE POINT OF FAILURE

FEDERALLY SPONSORED RESEARCH

Not Applicable.

SEQUENCE LISTING OR PROGRAM

Not Applicable.

BACKGROUND

1. Field of Invention

This invention relates to modular enclosures for components of redundant array of inexpensive disk (RAID) electronic data storage systems.

2. Prior Art

The acronym RAID refers to systems which combine disk drives for the storage of large amounts of data. In RAID systems the data is recorded by dividing each disk into stripes, while the data are interleaved so the combined storage space consists of stripes from each disk. RAID systems fall under 5 different architectures RAID 1–5, plus one addition type, RAID-0, which is simply an array of disks with data striping and does not offer any fault tolerance. RAID 1–5 systems use various combinations of redundancy, spare disks, and parity analysis to achieve conservation in reading and writing of data in the face of one, and, in some cases, multiple intermittent or permanent disk failures. Ridge, P. M. *The book of SCCSI: A guide for Adventurers.* Daly City Calif., No Starch Press. 1995. P. 323–329.

In order to increase reliability of RAID systems, conventional systems often have two or more controllers which control two or more arrays of direct access storage devices (DASD), each array often containing 6 or more DASDs, generally hard disks. Such RAID systems are arranged so that if one controller fails, another controller will take control of the other's DASD. In particular, in typical conventional RAID systems two controllers are arranged in a single chassis with a common backplane or cables and a common cooling system and a common power supply. The DASD are arranged in a multiple of chassis, each of which contains several individual DASD units (termed a "rack" of DASD). In conventional systems the controllers may share a common backplane or cables. Problems arise when there is a failure affecting the backplane or cables. When that occurs, both of the controllers may become inactivated or DASD may not be accessible, causing failure of the RAID system.

A backplane (termed a midplane if located near the middle of the chassis containing the controller or channel of DASD) is a circuit board with electronic components such as capacitors, resistors, chips, and connectors. A controller backplane serves to connect the two controllers, so that if one controller fails the other controller can detect the failure and communicate with the failed controller's DASD. A DASD backplane provides connectors into which several DASD can be inserted. The DASD may be connected to each other through one or more busses on the backplane.

Failure of a backplane or cable may be due to physical displacement of connectors, to physical failure of chips, to physical failure of traces on the boards, or to faults in cables or on computer boards. Failure of a common backplane which serves two controllers disrupts communications between the controllers and the DASD. Such an occurrence, while unexpected, has a catastrophic effect on the function of the RAID system, especially when two controllers share a single backplane or midplane, as in conventional RAID systems. In that case the entire RAID system becomes inactive. If data are striped within a single channel of direct access storage devices, the failure of a backplane serving the channel results in loss of data.

An active-active RAID system uses two RAID controllers that simultaneously process input and output (I/O) requests from host computers. The two RAID controllers communicate with one another, so that when one RAID controller fails, the surviving RAID controller takes over the identity of the failed RAID controller, takes over communication to the disks to which the failed RAID controller communicated, and takes over processing all the I/O operations for the RAID system.

After this automatic failover process, the failed RAID controller can be hot swapped, i.e., replaced with a functional RAID controller. The RAID controllers then perform a failback operation and restore the system to its original configuration. Thus, just as redundant disks enable a RAID system to continue operation after a disk fails, redundant RAID controllers in an active-active RAID system enable the system to continue operation after a RAID controller fails.

While an active-active RAID system can survive the failure of a disk or failure of a RAID controller, there are several other system components whose failure causes loss of data. This is a fundamental problem with prior art active-active systems.

For example, when a disk channel fails, the disks attached to that channel become unavailable. For RAID systems that have two disk channels and use parity RAID (such as RAID 5), the loss of the disks on a channel means the loss of data. This is a catastrophic failure of a RAID system to protect the integrity of data. There are a variety of problems that cause disk channel failure. The disk channel controller chip in a disk can fail and lock the disk channel. The disk channel controller chip in a RAID controller can fail and lock the disk channel. The physical disk channel itself can fail, e.g. as a result of the failure of a cable, a trace, a connector, or a terminator. In addition to these hardware failures, firmware in the disk channel controller chips in the disks or in the RAID controllers can lock a disk channel and cause catastrophic system failure.

In addition to disk channel failures, there are other single points of failure in RAID systems. A common example is the blackplane into which the RAID controllers are inserted. In the design of most active-active systems each RAID controller plugs into a common backplane. There are many ways in which a backplane can fail that cause the system to fail. Although some backplanes have only passive components to reduce the probability of failure, it is still the case that in most designs an active-active RAID system that uses a single backplane has multiple single points of failure that cause catastrophic data loss.

The communication link between controllers is another site for problems in an active-active RAID system. A link between controllers, sometimes called a heartbeat connect, is used to inform each controller of the status of the other controller. Should one RAID controller fail to send or respond to a signal, the other controller initiates failover activities. If the heartbeat connection fails while both controllers are operating properly, the system can become dysfunctional as both controllers attempt to take over the identification of the other controller and its disks.

The RAID system of the present invention avoids the failure of the RAID system or the loss of the data when there is a failure of any board, cable, power supply or cooling system in the controller chassis. In this invention, the two or more controllers which control the RAID system each have independent boards, cables, cooling, and power supply. Loss of one board, cable, cooling or power supply to one controller does not inactivate the entire RAID system or cause data loss. Similarly, loss of a board, cable, cooling or power supply to one direct access storage device DASD chassis results in inactivation of the affected DASD, but, since there is adequate redundancy in the racks of DASD units, the RAID system continues to function. In addition, this invention allows hot replacement of a failed controller along with associated backplanes, cables, power supply, or cooling system without interrupting the function of the RAID system.

The present invention insures the function of a RAID 1–5 system despite any single point of failure.

U.S. Pat. No. 5,761,032 discloses a removable media library unit with a frame structure with modular housing. A robot inserts media into the library and removes media no longer needed. There is continual access to one or more good storage devices while one or more failed drives of the library are repaired.

U.S. Pat. No. 5,871,264 discloses a drawer type computer housing with two sliding rails attached to the housing.

U.S. Pat. No. 6,018,456 discloses an enclosure system having a front and rear cages separated by a backplane. Connectors on either side of the backplane are used to connect trays containing drives in the front cage and sub-modules in the rear cage.

U.S. Pat. No. 6,025,989 discloses a modular node assembly for a rack mounted microprocessor computer. The assembly contains a power supply, fans, and removable chassis.

U.S. Pat. No. 6,061,250 discloses a full enclosure chassis system containing hot-pluggable circuit boards. A double height unit, such as a RAID controller, is combined with single height devices such as hard disk drives. The system allows the replacement of a controller circuit board without shutting down the system.

U.S. Pat. No. 6,097,604 discloses a carrier for installing electronic devices into an enclosure. An electronic device is attached to the carrier. Pushing the carrier into an enclosure causes metal surfaces on the carrier to be pushed outward contacting the enclosure side walls for electrical grounding.

U.S. Pat. No. 6,148,352 discloses a RAID system with provisions for adding a module or replacing a module without affecting host system access to existing online storage. Each storage module contains two sets of disk drives along with electronics for operating the disk drives. FIG. 10 shows storage systems with a power supply and a controller, in addition to the disks. In this system, one power supply serves one controller and 8 storage hard disk drives.

None of the prior art references provide the advantages of the present invention, that of the reliability of operation associated with an independent backplane board, cables, power supply and cooling system for each controller and for each rack of DASD. Conventional methods insure function of RAID systems despite failure of a single controller or DASD. With the innovations of the present invention, RAID systems are disclosed which function despite any failure of controller, DASD, backplane, or cable. The RAID systems of this invention eliminate the sharing of backplanes by more than one controller or more than one channel of DASD.

OBJECTS AND ADVANTAGES

The objective of this invention is to provide a RAID system of enhanced reliability.

Another objective is to provide a RAID system which functions despite any single point of failure.

Another objective is to provide a RAID system which functions despite failure of any single power supply or cooling system.

Another objective is to provide a modular RAID system which functions despite failure of any single module.

Another objective is to provide a modular RAID system wherein any failed module can be replaced without disruption to the function of the system.

Another objective is to provide a modular RAID system which is inexpensive, easy to construct, and capable of construction and operation without deleterious effects on the environment.

SUMMARY

The RAID data storage system of this invention comprises greater than one controller and a multiplicity of direct access storage devices. The direct access storage devices are arranged in one or more channels. Each channel comprises a multiplicity of direct access storage devices. Each controller is electrically connected to each direct access storage device of each channel, and each controller has a backplane component electrically connected to the electronic components of the controller. The backplane of each controller is a component of only one controller. Each channel of direct access storage devices has a backplane component electrically connected to each of the direct access storage devices. The backplane of each channel of direct access storage devices is a component of only one channel of direct access storage devices.

The RAID data storage system of this invention comprises greater than one controller, a multiplicity of direct access storage devices, the direct access storage devices arranged in racks of a multiplicity of direct access storage devices, each controller electrically connected to each direct access storage device, each controller and each rack of direct access storage devices having a power supply and a cooling system independent of each other power supply and cooling system, and no power supply or cooling system serving more than one controller or one rack of DASD.

DRAWINGS

—Figures

DETAILED DESCRIPTION

Figure 1:
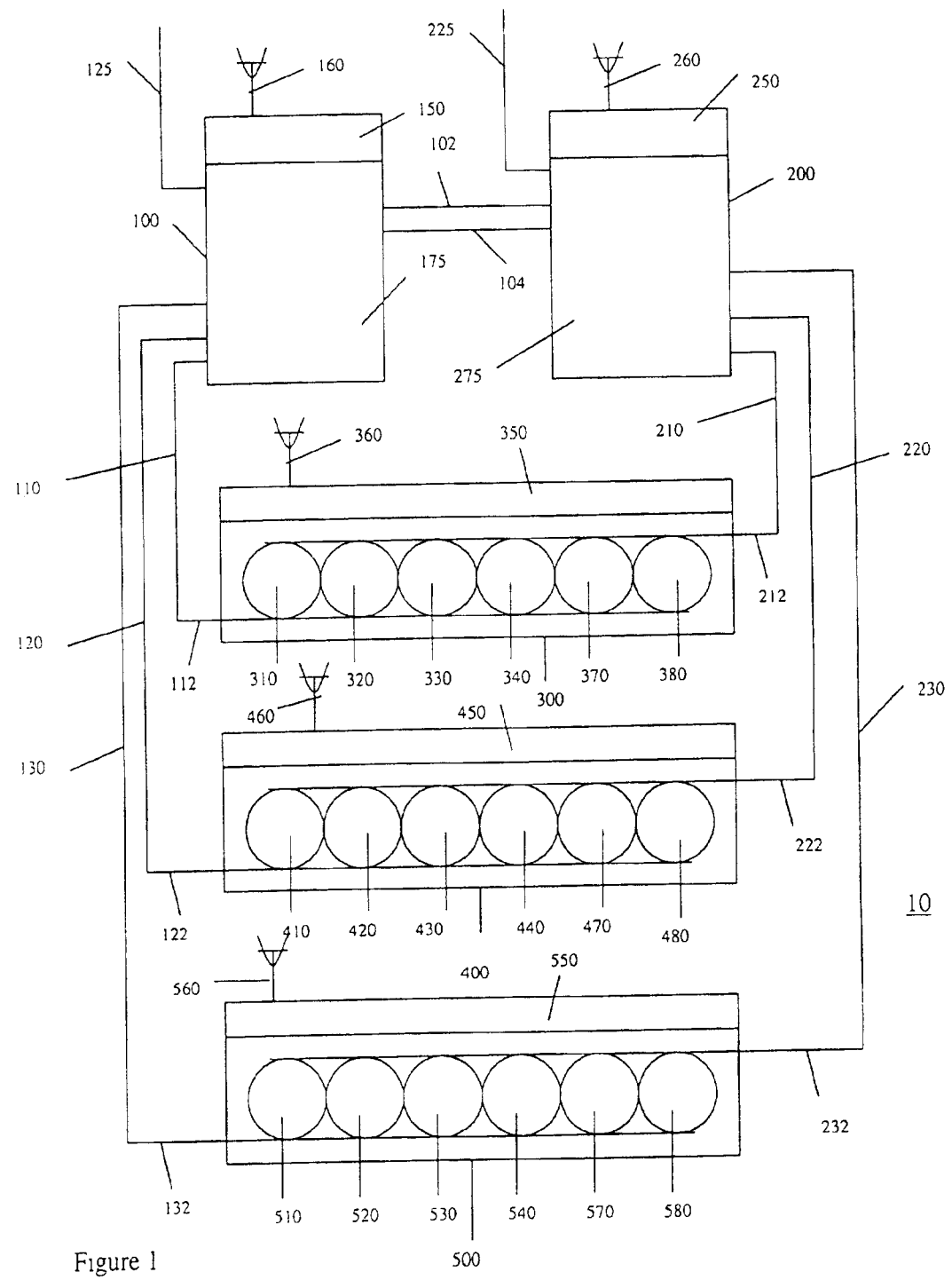
FIG. 1 is a schematic depiction of a first embodiment RAID system of this application.

FIG. 1 is a schematic of the external view of a preferred RAID system of this invention 10. This RAID system comprises two storage array controllers 175 and 275, and three racks of DASD or storage units 310–380, 410–480, and 510–580. A host computer is electrically connected to the storage array controllers 175 and 275 by connectors 125 and 225, respectively.

Any suitable connector may be used, such as a wire, copper wire, cable, optical fiber, or a SCSI bus.

In all of the Figures the convention is followed of depicting connectors which are not electrically connected as lines which cross perpendicularly. An electrical connection is indicated by a line which terminates perpendicularly at another line or at a symbol for a component. Thus in FIG. 1 a host computer (not shown in FIG. 1) is electrically connected to storage array controller 175 by connector 125. The host computer is not considered part of the RAID system and is not shown in FIG. 1.

DASD may be disks, tapes, CDS, or other suitable storage device. A preferred DASD is a disk.

All the storage units or DASD and connectors in a system taken as a whole is referred to as an "array" of storage units or DASD, respectively. In the example here the DASD are arranged in channels which consist of a number of DASD which are electrically connected to each other and to the storage array controller by connectors. The channels associated with controller 175 are designated in FIG. 1 as 112, 122, and 132. The number of channels may vary. A preferred number of channels is 6.

A channel, for example channel 112, consists of connector 110, DASD 310, DASD 320, DASD 330, DASD 340, DASD 370, and DASD 380. Although only 6 DASD are depicted in channel 112 of FIG. 1, there may be as many as 126 DASD in a channel. A preferred number of DASD in a channel is five.

The DASD are dual ported, with each DASD electrically connected to two controllers. For example, in FIG. 1, channel 212 consists of connector 210, DASD 310, DASD 320, DASD 330, DASD 340, DASD 370, and DASD 380.

Channel 122 consists of connector 120, DASD 410, DASD 420, DASD 430, DASD 440, DASD 470, and DASD 480.

Channel 222 consists of connector 220, DASD 410, DASD 420, DASD 430, DASD 440, DASD 470, and DASD 480.

Channel 132 consists of connector 130, DASD 510, DASD 520, DASD 530, DASD 540, DASD 570, and DASD 580.

Channel 232 consists of connector 230, DASD 510, DASD 520, DASD 530, DASD 540, DASD 570, and DASD 580.

The storage array controllers 175 and 275 are supported by and enclosed by chassis 100 and 200, respectively. Also supported and contained by chassis 100 and 200 are power supply and cooling systems 150 and 250, which serve storage array controllers 175 and 275, respectively with electrical power and cooling. Connector 160 connects power supply and cooling system 150 to the mains or other source of electrical power. Connector 260 connects power supply and cooling system 250 to the mains or other source of electrical power.

Storage array controller 175 is connected to storage array controller 275 by connectors 102 and 104.

DASD chassis 300 supports and encloses DASD 310, 320, 330, 340, 370 and 380, and also supports and encloses DASD power supply and cooling system 350, which provides electrical power and cooling to the DASD enclosed in DASD chassis 300. Connector 360 connects power supply and cooling system 350 to the mains or other source of electrical power DASD chassis 400 supports and encloses DASD 410, 420, 430, 440, 470 and 480, and also supports and encloses DASD power supply and cooling system 450, which provides electrical power and cooling to the DASD enclosed in DASD chassis 400. Connector 460 connects power supply and cooling system 450 to the mains or other source of electrical power DASD chassis 500 supports and encloses DASD 510, 520, 530, 540, 570 and 580, and also supports and encloses DASD power supply and cooling system 550, which provides electrical power and cooling to the DASD enclosed in DASD chassis 500. Connector 560 connects power supply and cooling system 550 to the mains or other source of electrical power.

A group of DASD in separate channels across which data are striped is referred to as a "tier" of DASD. A DASD may be uniquely identified by a channel number and a tier letter, for example DASD 310 is the first DASD of channel 112 and is in tier A, along with DASD 410 of channel 122, and DASD 510 of channel 132.

Data are striped across a tier of DASD in parity groups. A parity group is created when a binary digit is appended to a group of binary digits to make the sum of all the digits, including the appended binary digit, either odd or even, as preestablished. In this invention, each parity group extends over several tiers of DASD. Failure of any single channel of DASD therefore does not result in loss of data.

Additional tiers of DASD may be used.

A preferred storage array controller is the Fibre Sabre 2100 Fibre Channel RAID storage array controller manufactured by Digi-Data Corporation, of Jessup, Md.

Any suitable power system capable of converting electrical power from the mains or other supply of to power of suitable voltage and amperage for a storage array controller or for DASD can be used.

Any suitable cooling system capable of providing necessary cooling to a storage array controller or a channel of DASD can be used.

Any suitable host computer may be used. A preferred host computer is a PENTIUM microchip-based personal computer available from multiple vendors such as IBM, Research Triangle Park, N.C.; Compaq Computer Corp., Houston Tex.; or Dell Computer, Austin, Tex. PENTIUM is a trademark for microchips manufactured by Intel Corporation, Austin, Tex.

Although a specific example of a RAID system has been described here, this invention is applicable to any RAID system which comprises two or more storage array controllers and one or more channels of DASD.

Figure 2:
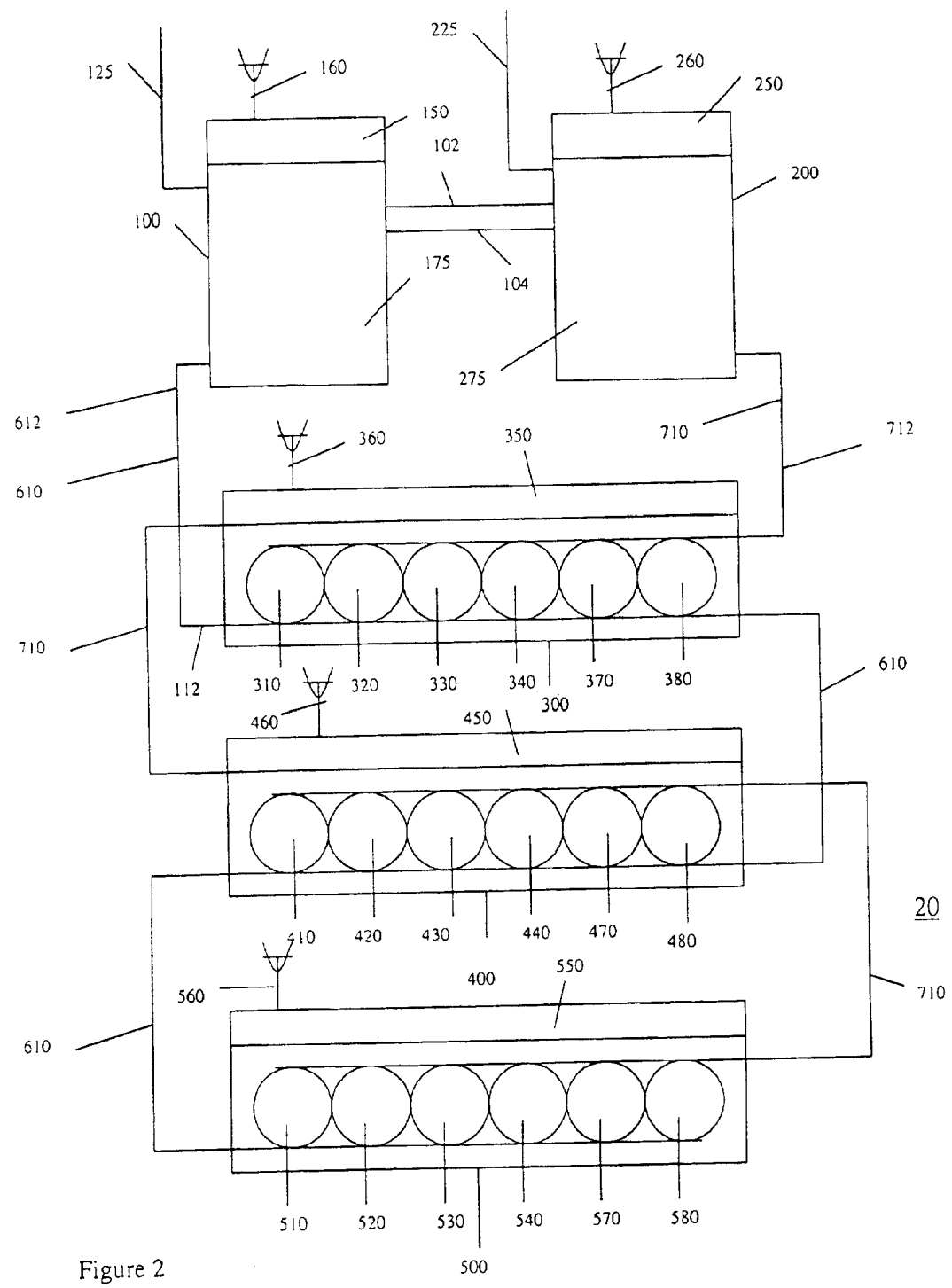
FIG. 2 is a schematic depiction of a second embodiment RAID system of this application.

FIG. 2 is a diagrammatically representation of the second embodiment RAID system of this invention 20. The elements of the second embodiment are identical to those of the first embodiment with the following exceptions. In the second embodiment, the channels span more than one DASD chassis. Such chassis are said to be "daisy-chained".

For example, channel 612 consists of connector 610, DASD 310, DASD 320, DASD 330, DASD 340, DASD 370, DASD 380, DASD 410, DASD 420, DASD 430, DASD 440, DASD 470, DASD 480, DASD 510, DASD 520, DASD 530, DASD 540, DASD 570, and DASD 580.

Channel 712 consists of connector 710, DASD 310, DASD 320, DASD 330, DASD 340, DASD 370, DASD 380, DASD 410, DASD 420, DASD 430, DASD 440, DASD 470, DASD 480, DASD 510, DASD 520, DASD 530, DASD 540, DASD 570, and DASD 580.

Figure 3:
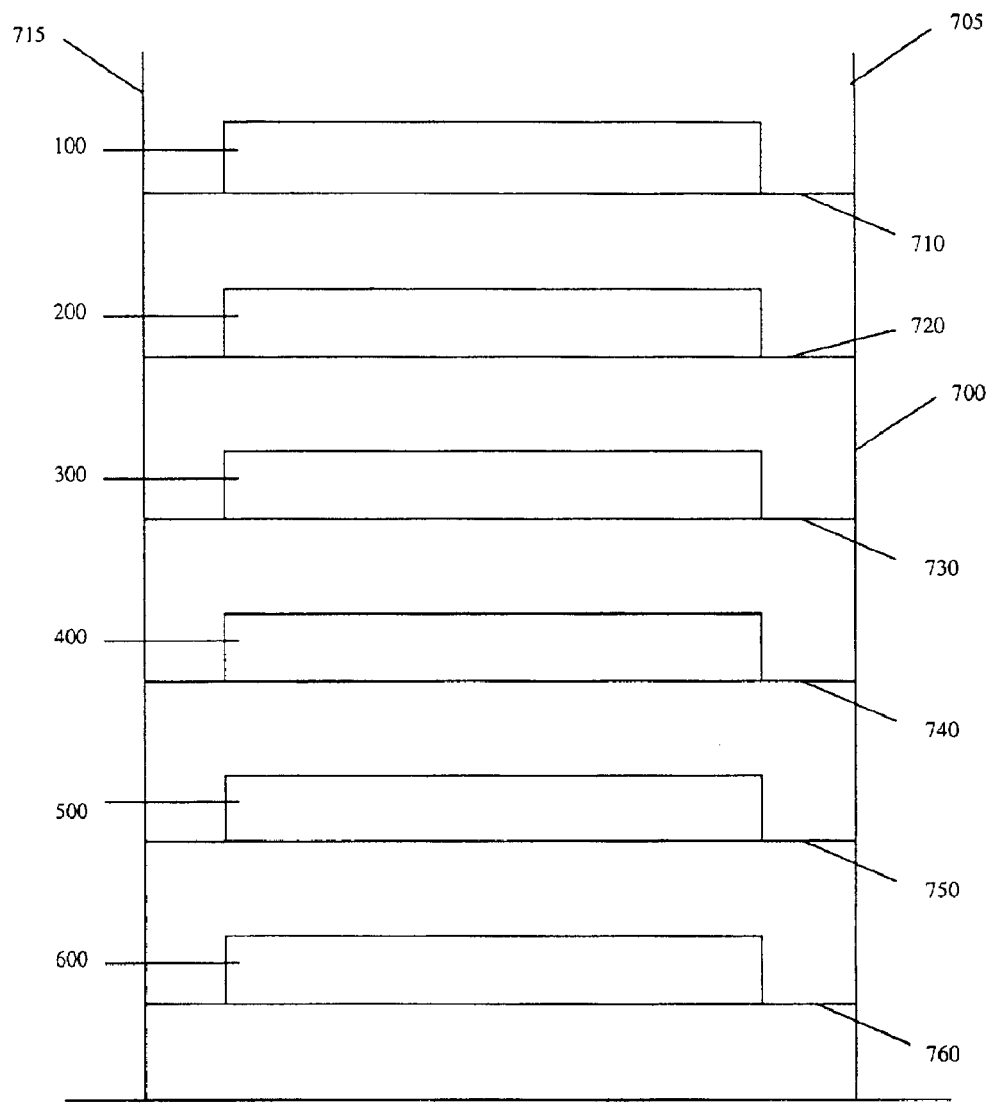
FIG. 3 is a diagrammatic side view of the modules of a RAID system of this application.

FIG. 3 diagrammatically shows a preferred arrangement of the storage array controller and DASD chassis of the RAID system of this invention.

A rack 700 is used to support the chassis of the RAID system. The rack 700 comprises the left vertical end 715, and right vertical end 705, which are connected by horizontal shelves 710, 720, 730, 740, 750, and 760. The storage array controller chassis 100 rests on shelf 710, and storage array controller chassis 200 rests on shelf 720. DASD chassis 300 rests on shelf 730, DASD chassis 400 rests on shelf 740, DASD chassis 500 rests on shelf 750, and DASD chassis 600 rests on shelf 760. The connectors associated with the RAID system are not shown in FIG. 3.

The term "module" is used to designate a self contained system component. A controller module consists of a chassis, a RAID controller, a power supply and a cooling system. Similarly, a DASD module consists of a DASD chassis plus the DASDs, a power supply, and a cooling system. Similarly, each cable used to connect one chassis with another chassis is a module.

Figure 4:
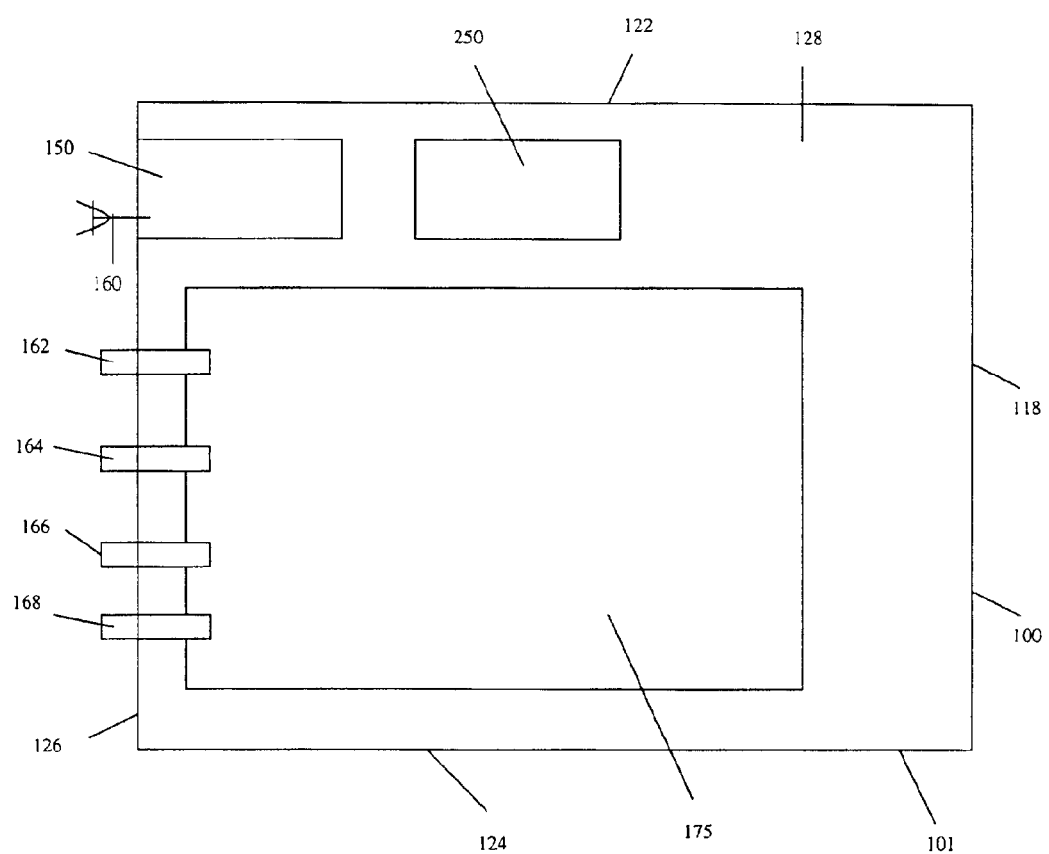
FIG. 4 is a top view of a storage array controller module of this application.

FIG. 4 is a diagrammatic representation of the top view of a storage array controller module 101 with the top panel removed. A chassis 100 encloses the internal components. Visible in FIG. 4 is the front panel 118 of the chassis, the back panel 126, left panel 122, right panel 124, and bottom panel 128. Also visible is the storage array controller 175, power supply 150, and cooling system 250. A connector 160 which provides power to the module is also shown. A plurality of connection sites 162, 164,166, 168 extend through the back panel 126 and are used to provide electrical connections between the storage array controller board 175 and host computers, channels of DASD, storage array controllers, and loop connector means for communicating with storage array controllers and host computers.

Figure 5:
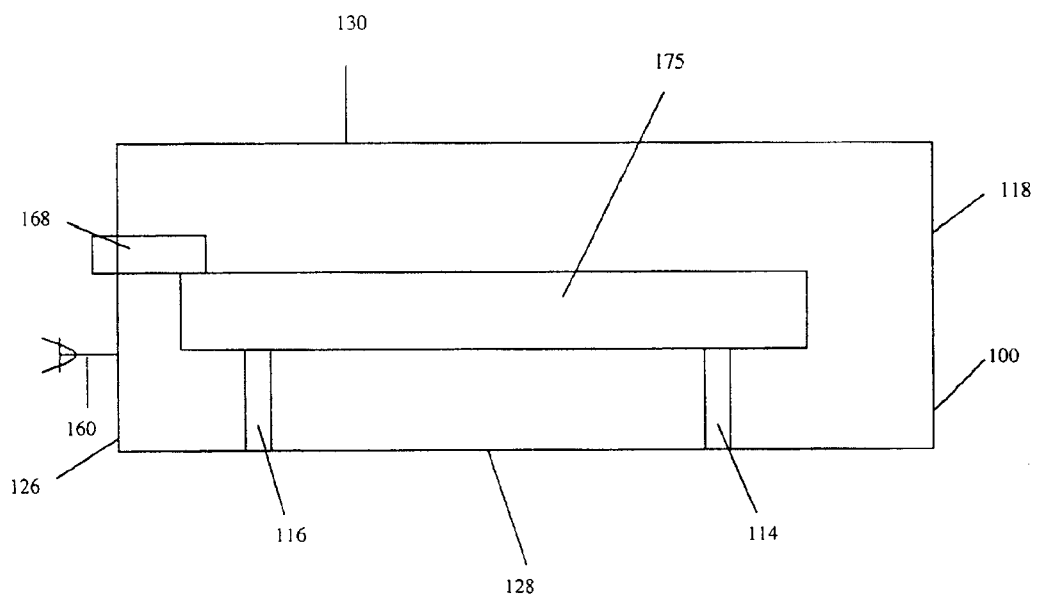
FIG. 5 is a side view of a storage array controller module of this application.

FIG. 5 is a side view of a storage array controller module 100 with the right panel removed. Visible in FIG. 5 is the front panel 118 of the chassis, the back panel 126, bottom panel 128 and top panel 130. The storage array controller 175 is supported by pegs 116 and 114. Also visible is a connection site 168 and the power connector 160.

—Operation

A RAID system of this invention will continue operation despite any single point of failure. Unlike conventional RAID systems, there are no shared components such as backplanes or midplanes, power supplies, cooling systems, or cables between the individual storage array controllers and the DASD channels which are controlled.

Failure of any single module, i.e. failure of any single storage array controller module, DASD module, or connector module does not halt the RAID system.

—Conclusions, Ramifications, and Scope

The RAID systems of this invention are able to function without loss of data despite the inactivation or loss of any one module. The inactive module may be hot swapped without halting the operations of the RAID system and without losing data.

It will be apparent to those skilled in the art that the examples and embodiments described herein are by way of illustration and not of limitation, and that other examples may be used without departing from the spirit and scope of the present invention, as set forth in the appended claims.

I claim:

1. A RAID data storage system comprising:
   greater than one controller,
   a multiplicity of direct access storage devices,
   the direct access storage devices arranged in one or more channels,
   each channel comprising a multiplicity of direct access storage devices,
   the direct access storage devices mounted on one or more chassis,
   each controller electrically connected to each direct access storage device of each channel by a connector,
   each controller having a backplane component electrically connected to the electronic components of the controller,
   the backplane of each controller a component of only one controller,
   each chassis of direct access storage devices having a backplane component electrically connected to each of the direct access storage devices by a connector, and
   the backplane of each channel of direct access storage devices a component of only one channel of direct access storage devices.

2. The RAID system of claim 1 wherein the connector is a wire, copper wire, cable, optical fiber, or a SCSI bus.

3. The RAID system of claim 1 wherein the connector is a cable.

4. The RAID system of claim 1 wherein the direct access storage device is a tape, a disk, or a CD.

5. The RAID system of claim 1 wherein the direct access storage device is a disk.

6. The RAID system of claim 5 wherein each disk is dual-ported.

7. The RAID system of claim 1 further comprising a power supply component and a cooling system component for each controller chassis, each power supply and cooling system a component of only one controller chassis.

8. The RAID system of claim 1 further comprising a power supply and a cooling system component for each chassis of direct access storage devices, each power supply and cooling system a component of only one chassis of direct access storage devices.

9. The RAID system of claim 1 wherein each controller is mounted in a controller chassis, each controller chassis having mounted in it only one controller.

10. The RAID system of claim 1 wherein a channel of direct access storage devices is mounted in a single channel chassis, the channel chassis having mounted in it only one channel of direct access storage devices.

11. The RAID system of claim 1 wherein a channel of direct access storage devices comprises direct access storage devices mounted on greater than one chassis.

12. The RAID system of claim 1 wherein data parity groups are extended over a multiplicity of channels so that no more than one data bit of a data parity group is stored in any channel.

13. The RAID system of claim 1 further comprising a rack,
   the rack comprised of vertical and horizontal elements,
   the horizontal elements arrayed between and supported by the vertical elements,
   each horizontal element supporting either a controller chassis or a direct access storage device chassis.

14. A RAID data storage system comprising:
   a first and a second controller,
   two or more channels of dual-ported disks,
   each channel comprising five dual-ported disks,
   each controller having a backplane component electrically connected to the electronic components of the controller,
   each channel of disks having a backplane component electrically connected to each of the disks,
   a separate cable attaching each disk in a channel to a controller, a first port of each disk electrically connected to the first controller, and a second port of each disk electrically connected to the second controller, wherein the backplane of each controller is a component of only one controller, and the backplane of each channel of disks is a component of only one channel of disks.

15. A RAID system comprising:

greater than one controller modules, each controller module comprising a controller, a backplane, a power supply, and a cooling system, and a multiplicity of direct access storage device modules, each direct access storage device module comprising a multiplicity of direct access storage devices, a backplane, a power supply, and a cooling system, each controller module electrically connected by a connector module to each direct access storage device module, the RAID data storage system capable of function despite the failure of any one module.

16. A RAID data storage system comprising:

greater than one controller, each controller mounted on a controller chassis, each controller chassis having only one controller mounted thereon, a multiplicity of direct access storage devices, the direct access storage devices arranged in one or more channels, each channel comprising a multiplicity of direct access storage devices, the direct access storage devices of each channel mounted on one or more chassis, and each controller electrically connected to each direct access storage device of each channel by a connector.

17. The RAID system of claim 16 wherein the connector is a wire, copper wire, cable, optical fiber, or a SCSI bus.

18. The RAID system of claim 16 wherein the connector is a cable.

19. The RAID system of claim 16 wherein the direct access storage device is a tape, a disk, or a CD.

20. The RAID system of claim 16 wherein the direct access storage device is a disk.

21. The RAID system of claim 20 wherein each disk is dual-ported.

22. The RAID system of claim 16 further comprising a power supply and a cooling system component mounted in each controller chassis, each power supply and cooling system a component of only one controller chassis.

23. The RAID system of claim 16 further comprising a power supply and a cooling system component for each chassis of direct access storage devices, each power supply and cooling system a component of only one chassis of direct access storage devices.

24. The RAID system of claim 16 wherein a channel of direct access storage devices is mounted in only one chassis.

25. The RAID system of claim 16 wherein a channel of direct access storage devices is mounted in greater than one chassis.

26. The RAID system of claim 16 wherein data parity groups are extended over a multiplicity of channels so that no more than one data bit of a data parity group is stored in any channel.

27. The RAID system of claim 16 further comprising a rack, the rack comprised of vertical and horizontal elements, the horizontal elements arrayed between and supported by the vertical elements, each horizontal element supporting either a controller chassis or a direct access storage device chassis.

* * * * *